US005971193A

United States Patent [19]

Sadler et al.

[11] Patent Number: 5,971,193

[45] Date of Patent: Oct. 26, 1999

[54] CONTAINER FOR SWIMMING POOL MAINTENANCE ACCESSORIES AND RELATED METHODS

[75] Inventors: James T. Sadler, Indialantic; Glenn E. Bryan, Melbourne, both of Fla.

[73] Assignee: Veetop Corporation, Indiatlantic, Fla.

[21] Appl. No.: 09/092,930

[22] Filed: Jun. 5, 1998

Related U.S. Application Data

[60] Provisional application No. 60/049,830, Jun. 13, 1997.

[51] Int. Cl.[6] .............................. B60R 9/00; B65D 85/00

[52] U.S. Cl. ........................... 220/485; 220/503; 206/373

[58] Field of Search .................................... 220/485, 491, 220/493, 503, 735, 736; 206/373

[56] References Cited

U.S. PATENT DOCUMENTS

| | | | |
|---|---|---|---|
| D. 342,142 | 12/1993 | Jablonski | D25/2 |
| 3,305,125 | 2/1967 | Chesley | 220/485 |
| 3,647,077 | 3/1972 | Gillespie | 211/126 |
| 3,704,791 | 12/1972 | Young, Jr. | 220/485 X |
| 4,113,131 | 9/1978 | Joseph | 220/19 |
| 4,848,620 | 7/1989 | Chap | 220/491 |
| 4,919,290 | 4/1990 | Wadel | 220/503 |
| 5,815,933 | 10/1998 | Hernandez | 220/485 X |

*Primary Examiner*—Steven Pollard
*Attorney, Agent, or Firm*—Allen, Dyer, Doppelt, Milbrath & Gilchrist, P.A.

[57] ABSTRACT

A container for swimming pool maintenance accessories includes a generally rectangular bottom panel having opposing sides and opposing ends; a pair of generally rectangular opposing side panels extending upwardly from the respective sides of the bottom panel; and a pair of generally rectangular opposing end panels extending upwardly from the ends of the bottom panel. The side panels and end panels preferably have upper portions defining a generally rectangular first access opening. Each of the end panels includes upper portions defining a notch to receive an elongate swimming pool maintenance accessory, such as an extensible pole. In addition, the container preferably includes a shelf panel positioned in spaced relation from the bottom panel and from the first access opening to define respective lower and upper storage compartments for pool maintenance accessories. One of the side panels preferably has a second access opening therein communicating with the lower storage compartment. Accordingly, a flexible hose, such as for pool vacuuming may be stored in the upper storage compartment, and other accessories, such as a water chemistry test kit, can be stored in the lower storage compartment.

35 Claims, 6 Drawing Sheets

CONTAINER FOR SWIMMING POOL MAINTENANCE ACCESSORIES AND RELATED METHODS

RELATED APPLICATION

The present application is based upon provisional application No. 60/049,830 filed Jun. 13, 1997.

FIELD OF THE INVENTION

The present invention relates to the field of storage containers, and, more particularly, to a container for maintenance tools and accessories for swimming pool care.

BACKGROUND OF THE INVENTION

Swimming continues to be a popular sport and recreational activity, especially during the warmer months of the year. In particular, backyard swimming pools are enjoyed by many homeowners. While such pools provide many hours of entertainment and enjoyment, they also typically require periodic maintenance to ensure cleanliness and high water quality.

For example, a typical pool may require periodic skimming of floating debris. This may be accomplished by an automatic pool skimmer; however, manual skimming may also be desired in place of or as a supplement to automatic skimming. A typical manual pool skimmer includes an extensible pole, and a removable skimmer head including a frame carrying a net material. A brush head for scrubbing the pool surfaces may also typically be provided. The brush head may also be connected to the extensible pool when needed.

Yet another common maintenance function associated with a swimming pool is manual vacuuming of the pool bottom. While automatic pool cleaners are common, periodic supplemental manual vacuuming is also typically performed. The conventional pool vacuum includes a vacuum head carried by the extensible pole, and a flexible hose typically about thirty feet in length connected between the vacuum head and pool water filtration system.

Water chemical parameters, such as relating to the chlorine level, pH, etc. are also typically monitored by the pool caretaker. Chemical test kits are widely available with easy to use instructions which permit the pool caretaker to quickly and reliably determine any needed chemical treatment of the pool water.

Unfortunately, despite the widespread availability of the above mentioned tools and accessories for helping to maintain a swimming pool, the pool caretaker is left with a plurality of individual items that are not readily stored or transported. For example, the flexible vacuum hose is relatively bulky and awkward to carry. The vacuum hose is also desirably positioned to permit the drainage of water. The extensible pole and multiple accessory heads for the pole are also not conveniently stored or carried. The result is often a rather haphazard arrangement of pool care accessories in an unsightly pile by the pool.

SUMMARY OF THE INVENTION

In view of the foregoing background, it is therefore an object of the present invention to provide a container and related method for pool maintenance accessories.

This and other objects, features, and advantages in accordance with the present invention are provided by a container for swimming pool maintenance accessories comprising a generally rectangular bottom panel having opposing sides and opposing ends; a pair of generally rectangular opposing side panels extending upwardly from the respective sides of the bottom panel; and a pair of generally rectangular opposing end panels extending upwardly from the ends of the bottom panel. The side panels and end panels preferably have upper portions defining a generally rectangular first access opening.

Each of the end panels preferably comprise upper portions defining a notch to receive an elongate swimming pool maintenance accessory, such as an extensible pole. In addition, the container preferably includes a shelf panel, positioned in spaced relation from the bottom panel and from the first access opening, to define respective lower and upper storage compartments for pool maintenance accessories. One of the side panels preferably has a second access opening therein communicating with the lower storage compartment. Accordingly, a flexible hose, such as for pool vacuuming may be stored in the upper storage compartment, and other accessories, such as a water chemistry test kit, can be stored in the lower storage compartment.

The upper portion of each of the end panels preferably defines a V-shape to define the notches which receive the extensible pole. At least one of the bottom panel, side panels, end panels, and shelf panel may have openings therein to permit water to drain therethrough. For example, in one particularly advantageous embodiment, all of the panels may have a mesh configuration, such as formed of plastic-coated wire, for example.

The container may also preferably include a pair of handles carried by upper portions of respective side panels. The handles may be generally U-shaped and have ends pivotally connected to the upper portions of respective side panels.

The container preferably includes at least one mounting bracket carried by at least one of a side panel for supporting a pool maintenance accessory. For example, the bracket may mount the shaft portion of an accessory head, such as a skimmer or brush.

The side panel with the second access opening preferably has a wall portion extending between the bottom panel and the second access opening. Accordingly, accessories stored in the lower compartment will remain therein until removed by the user. In addition, the second access opening preferably has a generally rectangular shape.

Yet another important feature of the invention is that the bottom panel defines a smaller outline than the first access opening so that multiple containers are nestable. Accordingly, shipping and storage are simplified.

A method aspect of the invention is for storing swimming pool maintenance accessories, such as comprising an elongate member, a flexible hose, and at least one other accessory. The method preferably comprises the steps of providing a container as described above; positioning the elongate member to be received in the notches of the side panels; positioning the flexible hose in the upper storage compartment; and positioning the at least one other pool maintenance accessory in the lower storage compartment. The method may further include the step of mounting at least one other pool maintenance accessory to at least one mounting bracket carried by a side panel.

DETAILED DESCRIPTION OF THE PREFERRED EMBODIMENTS

Figure 1:
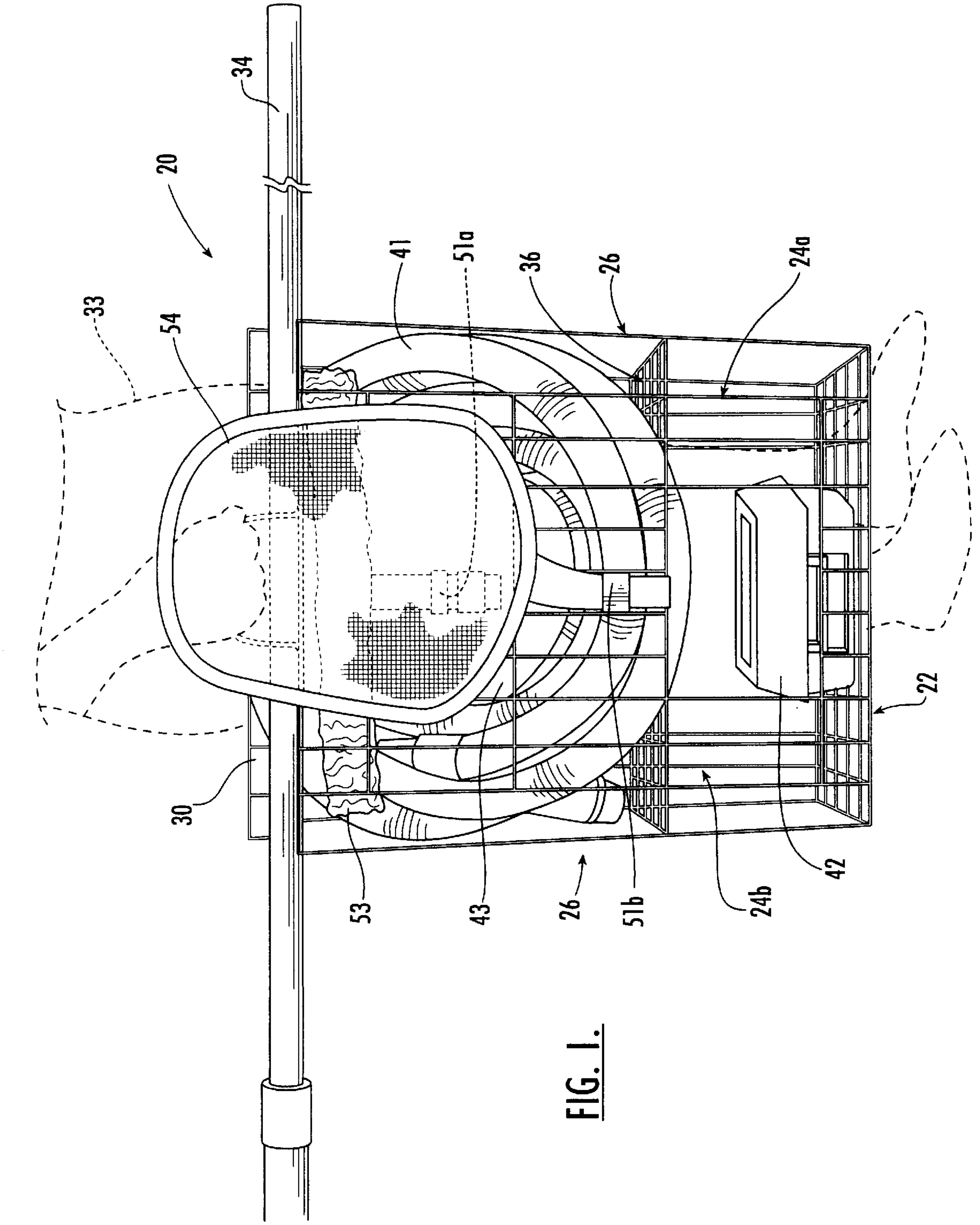
FIG. 1 is a perspective view of the container and associated pool maintenance accessories stored therein and being carried in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The container 20 for swimming pool maintenance accessories in accordance with the present invention is now explained with reference to the drawings FIGS. 1–7. The container 20 includes a generally rectangular bottom panel 22 (FIGS. 1 and 5) having opposing sides and opposing ends. A pair of generally rectangular side panels 24*a*, 24*b* (FIGS. 1, 2 and 4) extend upwardly from the respective sides of the bottom panel 22. The pair of side panels illustratively includes a front side panel 24*a* (FIG. 2) and a rear side panel 24*b* (FIG. 4).

The container 20 also includes a pair of generally rectangular opposing end panels 26 (FIGS. 1 and 3) extending upwardly from the ends of the bottom panel 22. The side panels 24*a*, 24*b* and end panels 26 preferably have upper portions defining a generally rectangular first access opening 30. Each of the end panels 26, as shown perhaps best in FIG. 3, comprise upper portions in a V-shape to define a notch 32 in a medial portion thereof. The notches 32 receive a horizontally positioned elongate swimming pool maintenance accessory, such as an extensible pole 34 (FIGS. 1 and 3) to facilitate carrying the pole with the other accessories.

Figure 2:
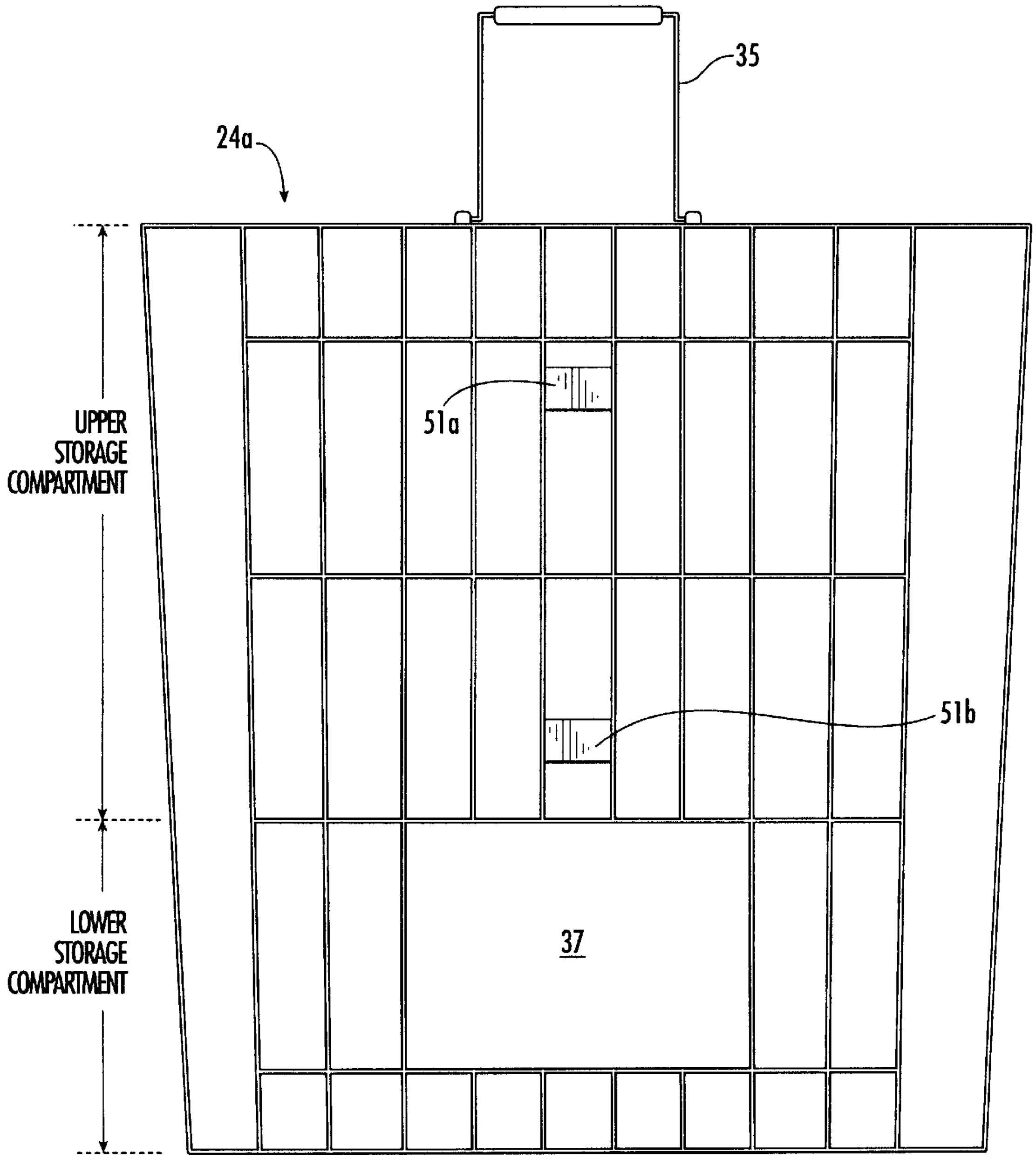
FIG. 2 is an elevational view of a front side panel of the container as shown in FIG. 1.

The container 20 also includes a shelf panel 36 (FIGS. 1 and 6) that is positioned in spaced relation from the bottom panel 20 and from the first access opening 30. Accordingly, the shelf panel 36 defines respective lower and upper storage compartments for pool maintenance accessories as labeled in FIG. 2. As also shown in FIG. 2, the front side panel 24*a* has a second access opening therein 37 communicating with the lower storage compartment. Accordingly, a flexible hose 41, (FIG. 1) such as for pool vacuuming, may be stored in the upper storage compartment, and other accessories, such as a water chemistry test kit 42, can be stored in the lower storage compartment. The vacuum head 43 may also be stored in the upper storage compartment. In addition, smaller accessories, such as brushes, a thermometer, tile cleaners, etc. may be stored in the lower storage compartment.

Figure 7:
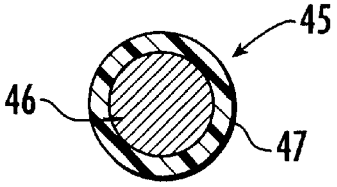
FIG. 7 is a greatly enlarged cross-sectional view of a wireframe portion of the container as shown in FIG. 1.

In the illustrated embodiment, the container 20 is formed by wireframe 45 construction, a cross-section of which is shown in FIG. 7. The wireframe material 45 preferably includes a galvanized steel wire or core 46 for strength and durability, and the covering 47 may be a durable plastic or other coating to also resist corrosion and provide a durable surface as will be readily appreciated by those skilled in the art. Of course in other embodiments, the wall panels need not be the wireframe construction. What is preferred, however, is that the at one of the bottom panel 22, side panels 24*a*, 24*b*, end panels 26, and shelf panel 36 may have openings therein to permit water to drain therethrough. Water containing chlorine can rapidly deteriorate many plastics or metals.

Figure 3:
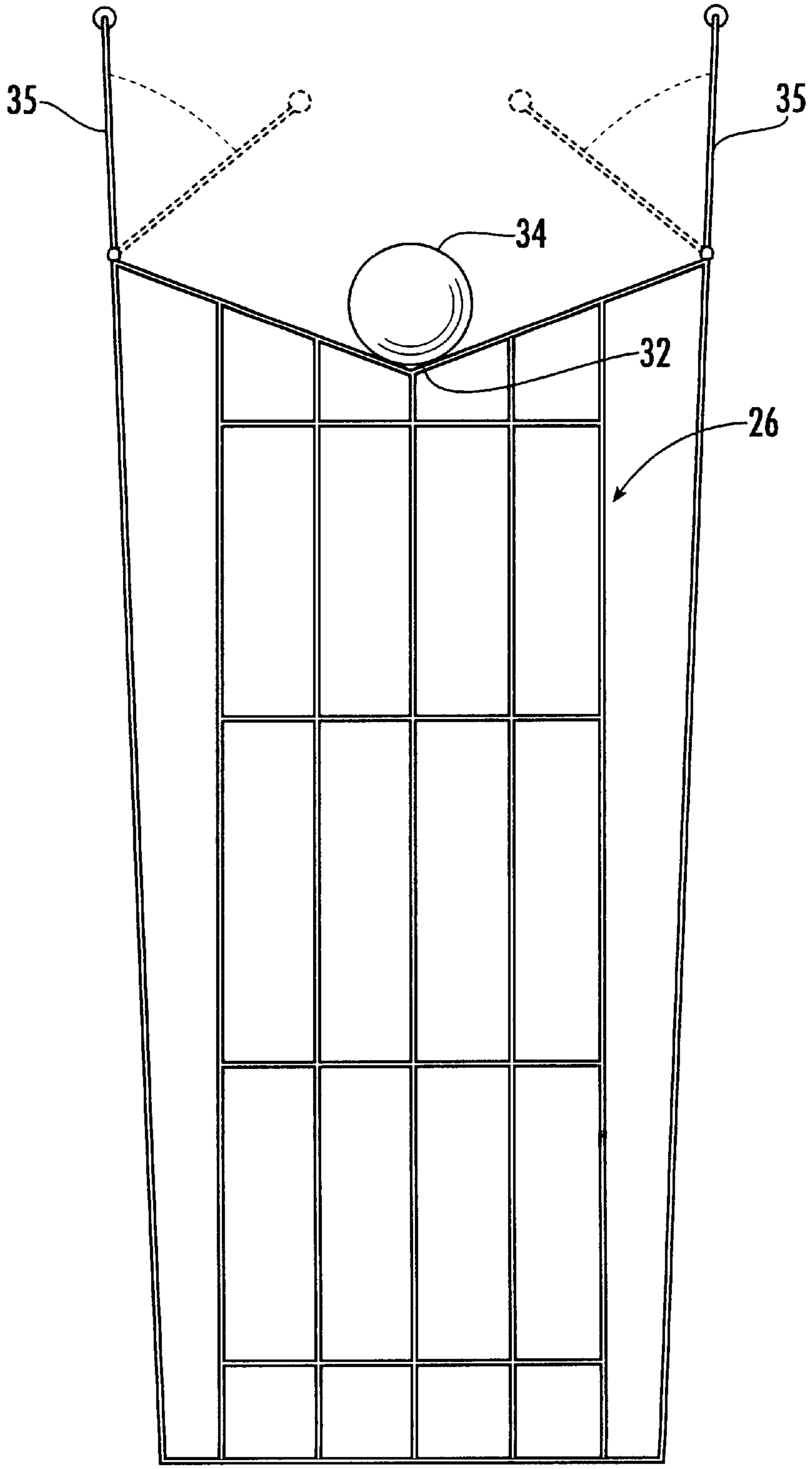
FIG. 3 is an elevational view of an end panel of the container as shown in FIG. 1.
Figure 4:
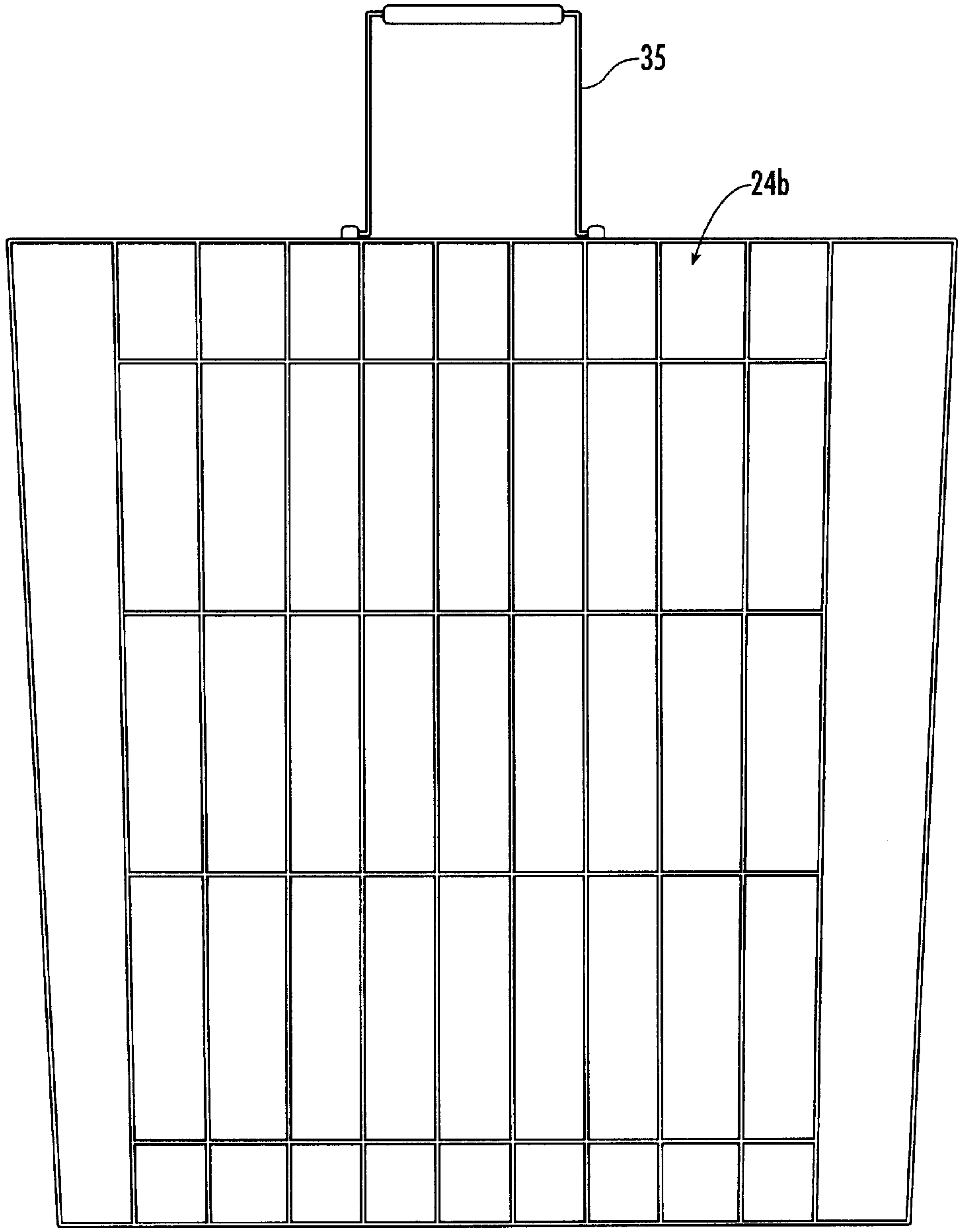
FIG. 4 is an elevational view of a back side panel of the container as shown in FIG. 1.
Figure 5:
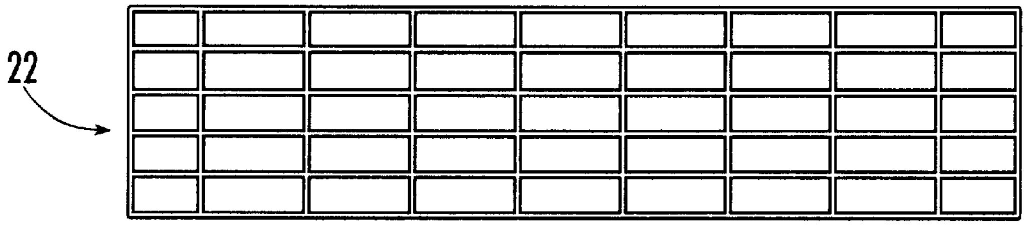
FIG. 5 is reduced plan view of the bottom panel of the container as shown in FIG. 1.
Figure 6:
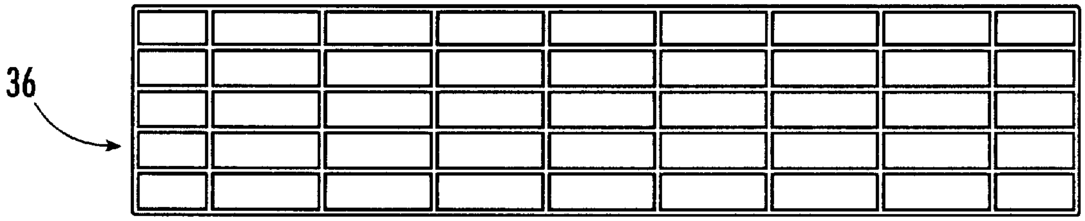
FIG. 6 is a reduced plan view of the shelf panel of the container as shown in FIG. 1.

As shown perhaps best in FIGS. 2–4, the container 20 also preferably includes a pair of handles 35 carried by upper portions of respective side panels 24*a*, 24*b*. The handles 35 may be generally U-shaped and have ends pivotally connected to the upper portions of respective side panels. When grasped by the hand of the user 33 as shown in FIG. 1, the handles 35 urge the side panels 24*a*, 24*b* together to more securely maintain the extensible pole 34 in the notches 32.

The container 20 also illustratively includes a pair of spaced apart mounting brackets 51*a*, 51*b* carried by the front side panel 24*a* for supporting pool maintenance accessories. As shown in FIG. 1, a brush head 53 is carried by the upper bracket 51*a*, and a skimmer head 54 is carried by the lower bracket 51*b*. of course, those of skill in the art will appreciate other similar arrangement as contemplated by the present invention. The brackets 51*a*, 51*b* may be in the form of rings, or other similar configurations as will also be readily appreciated by those skilled in the art. The brackets 51*a*, 51*b* may also be detachable to permit removal to thereby facilitate nesting of containers 20 as described in greater detail below.

In the illustrated embodiment, the brackets 51*a*, 51*b* are placed on the front side panel 24*a* so that access is provided to the brush head 53 and skimmer head 54 from the front of the container 20. The front side panel 24*a* also includes the second access opening 37 to the lower compartment. Accordingly, the container 20 may be secured to a wall, for example, and access to the tools carried thereby is still readily provided from the front of the container 20. When secured to a wall, for example, the extensible pole 34 may extend through the shelf and bottom panels 36, 22 to be held in a vertical orientation.

Returning now again more particularly to the view of the front panel 24*a* as shown in FIG. 2, the front side panel with the second access opening 37 preferably has a portion extending between the bottom panel 22 and the second access opening. In other words, a wall portion is preferably provided below the second access opening 37. Accordingly, accessories stored in the lower compartment will be held therein.

The second access opening 37 illustratively has a generally rectangular shape, although other shapes may be provided in other embodiments. The second access opening 37 is generally sized to receive the water quality test kit 42 therein as will be readily appreciated by those skilled in the art. For example, the second access opening 37 may be about 6" by 10".

Other typical dimensions for the components of the container 20 are 10" by 20" for the bottom panel 22. The side panels 24*a*, 24*b* may have a lower edge length of about 20" and an upper edge length of about 22", and an overall height of about 24". Similarly, the end panels 26 may have a lower edge width of about 10", and an upper edge width of about 12", along with an overall height of about 24". The overall height allows the typical user to carry the container 20 with his arm fully extended for comfort. These typical dimensions highlight yet another important feature of the invention wherein the bottom panel 22 defines a smaller outline than the first or upper access opening 30 so that multiple containers 20 are nestable. This nesting features provides significant advantages for storing, shipping, and/or displaying containers 20.

Figure 8:
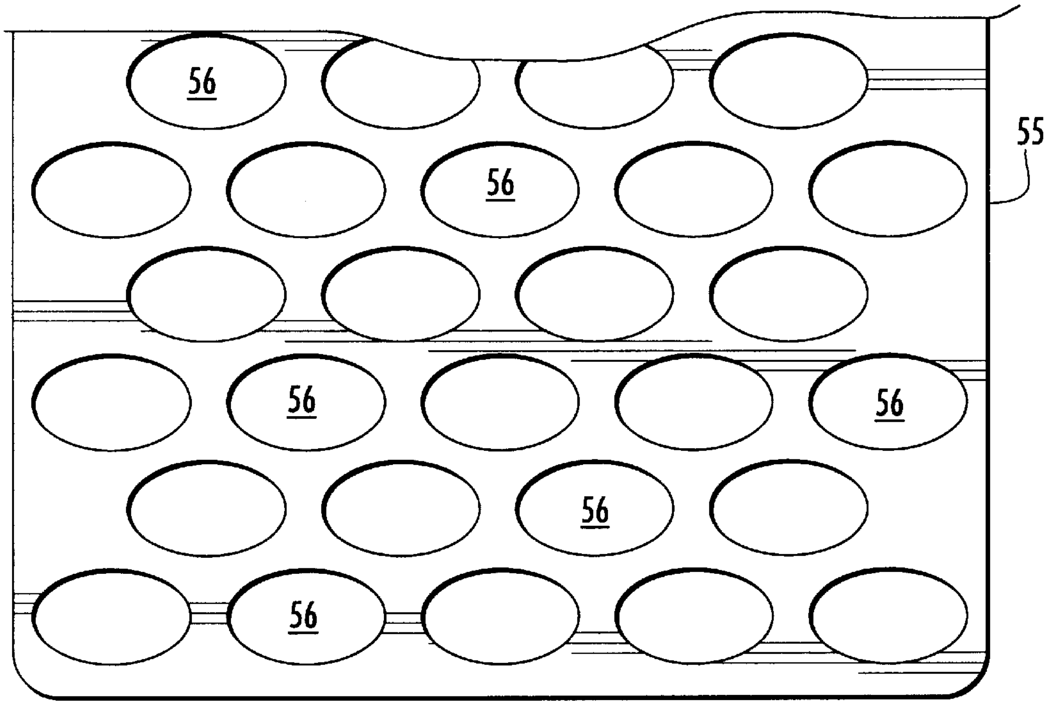
FIG. 8 is an enlarged elevational view of a wall portion of a panel of a second embodiment of the invention.
Figure 9:
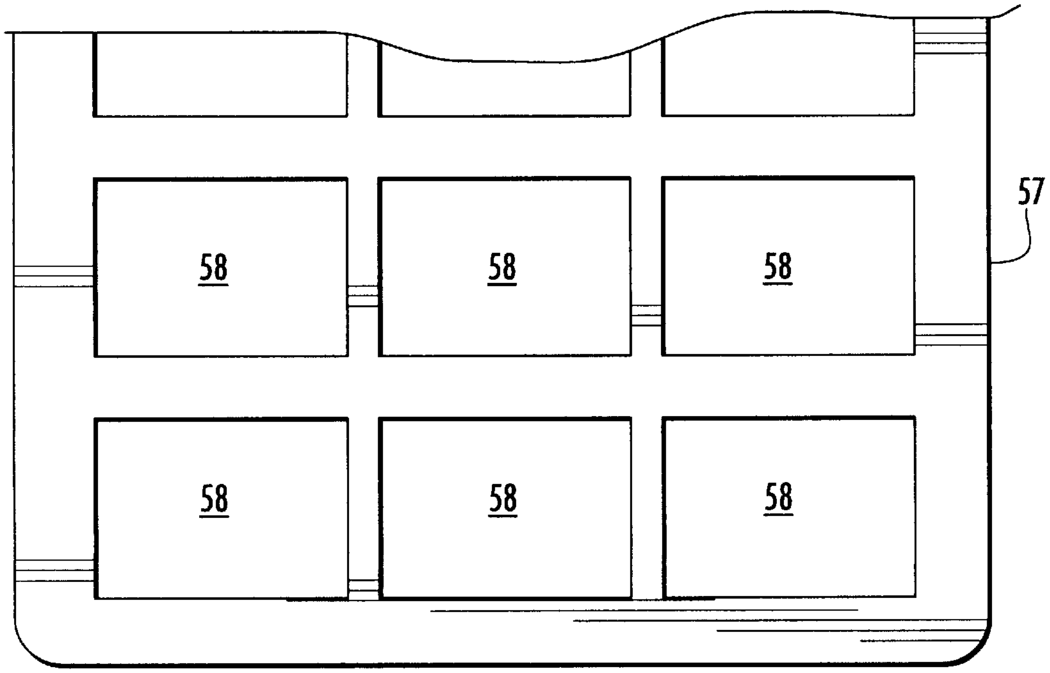
FIG. 9 is an enlarged elevational view of a wall portion of a panel of a third embodiment of the invention.

Turning now additionally to FIGS. 8 and 9 other configurations for the panels of the container 20 are explained. In FIG. 8 the panel portion 55 includes offset oval openings 56 defining a mesh. FIG. 9 shows a regular pattern of rectangular openings 58 in the panel portion 57 defining a mesh. Of course those of skill in the art will appreciate many other similar arrangement as contemplated by the present invention.

A method aspect of the invention is for storing swimming pool maintenance accessories, including an elongate member, such as the extensible pole 34, a flexible hose 41, and at least one other accessory, such as the water test kit 42. The method preferably comprises the steps of providing a container 20 as described above; positioning the extensible pole 34 to be received in the notches 32 of the side panels 24*a*, 24*b*; positioning the flexible hose 41 in the upper storage compartment; and positioning the at least one other pool maintenance accessory 42 in the lower storage compartment. The method may further include the step of mounting a pool skimmer head 54 and/or brush head 53 to respective mounting brackets 51*b*, 51*a* carried by the front side panel 24*a*.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A container for swimming pool maintenance accessories comprising:

a generally rectangular bottom panel having opposing sides and opposing ends;

a pair of generally rectangular opposing side panels extending upwardly from the respective sides of said bottom panel;

a pair of generally rectangular opposing end panels extending upwardly from the ends of said bottom panel;

said side panels and said end panels having upper portions defining a generally rectangular first access opening;

each of said end panels comprising upper portions defining a notch to receive an elongate swimming pool maintenance accessory; and a shelf panel positioned in spaced relation from said bottom panel and from said first access opening to define respective lower and upper storage compartments for pool maintenance accessories;

at least one of said side panels having a second access opening therein communicating with the lower storage compartment.

2. A container according to claim 1 wherein the upper portion of each of said end panels defines a generally V-shape.

3. A container according to claim 1 wherein at least one of said bottom panel, side panels, end panels, and shelf panel has openings therein to permit water to drain therethrough.

4. A container according to claim 1 wherein all of said panels have a mesh configuration.

5. A container according to claim 1 further wherein all of said panels comprise plastic coated wire.

6. A container according to claim 1 further comprising a pair of handles carried by upper portions of respective side panels.

7. A container according to claim 6 wherein said handles are generally U-shaped and have ends pivotally connected to the upper portions of respective side panels.

8. A container according to claim 1 further comprising at least one mounting bracket carried by at least one of said side panels for supporting a pool maintenance accessory.

9. A container according to claim 8 wherein said at least one mounting bracket has a ring shape.

10. A container according to claim 1 wherein the at least one side panel with the second access opening has a portion extending between said bottom panel and said second access opening.

11. A container according to claim 10 wherein said second access opening has a generally rectangular shape.

12. A container according to claim 1 further wherein said bottom panel defines a smaller outline than the first access opening so that multiple containers are nestable.

13. A container for swimming pool maintenance accessories comprising:

a generally rectangular bottom mesh panel having opposing sides and opposing ends;

a pair of generally rectangular opposing mesh side panels extending upwardly from the respective sides of said mesh bottom panel;

a pair of generally rectangular opposing mesh end panels extending upwardly from the ends of said mesh bottom panel;

said mesh side panels and mesh end panels having upper portions defining a generally rectangular first access opening;

each of said mesh end panels comprising upper portions having a generally V-shape to receive an elongate swimming pool maintenance accessory; and a mesh shelf panel positioned in spaced relation from said mesh bottom panel and from said first access opening to define respective lower and upper storage compartments for pool maintenance accessories;

at least one of said mesh side panels having a second access opening therein communicating with the lower storage compartment.

14. A container according to claim 13 further wherein all of said mesh panels comprise plastic coated wire.

15. A container according to claim 13 further comprising a pair of handles carried by upper portions of respective mesh side panels.

16. A container according to claim 15 wherein said handles are generally U-shaped and have ends pivotally connected to the upper portions of respective mesh side panels.

17. A container according to claim 13 further comprising at least one mounting bracket carried by at least one of said mesh side panels for supporting a pool maintenance accessory.

18. A container according to claim 17 wherein said at least one mounting bracket has a ring shape.

19. A container according to claim 13 wherein the at least one mesh side panel with the second access opening has a portion extending between said mesh bottom panel and said second access opening.

20. A container according to claim 13 further wherein said mesh bottom panel defines a smaller outline than the first access opening so that multiple containers are nestable.

21. A combination of a plurality of swimming pool maintenance accessories comprising an elongate member, a flexible hose, and at least one other accessory, and a container for the swimming pool maintenance accessories, said container comprising:

a generally rectangular bottom panel having opposing sides and opposing ends;

a pair of generally rectangular opposing side panels extending upwardly from the respective sides of said bottom panel;

a pair of generally rectangular opposing end panels extending upwardly from the ends of said bottom panel;

said side panels and end panels having upper portions defining a generally rectangular first access opening;

each of said end panels comprising upper portions defining a notch to receive the elongate member; and a shelf panel positioned in spaced relation from said bottom panel and from said first access opening to define respective lower and upper storage compartments for pool maintenance accessories, said upper storage compartment for receiving the flexible hose, said lower storage compartment for receiving the at least one other accessory;

at least one of said side panels having a second access opening therein communicating with the lower storage compartment.

22. A combination according to claim 21 wherein the upper portion of each of said end panels defines a generally V-shape.

23. A combination according to claim 21 wherein at least one of said bottom panel, side panels, end panels, and shelf panel has openings therein to permit water to drain therethrough.

24. A combination according to claim 21 wherein all of said panels have a mesh configuration.

25. A combination according to claim 21 further wherein all of said panels comprise plastic coated wire.

26. A combination according to claim 21 further comprising a pair of handles carried by upper portions of respective side panels.

27. A combination according to claim 26 wherein said handles are generally U-shaped and have ends pivotally connected to the upper portions of respective side panels.

28. A combination according to claim 21 wherein said plurality of pool maintenance accessories further comprises a head assembly to be removably secured to the elongate member; further comprising at least one mounting bracket carried by at least one of said side panels for receiving the head assembly.

29. A combination according to claim 28 wherein said head assembly comprises one of a brush, a skimmer, and a vacuum.

30. A combination according to claim 28 wherein said at least one mounting bracket has a ring shape.

31. A combination according to claim 21 wherein the at least one side panel with the second access opening has a portion extending between said bottom panel and said second access opening.

32. A combination according to claim 21 wherein said second access opening has a generally rectangular shape.

33. A combination according to claim 21 further wherein said bottom panel defines a smaller outline than the first access opening so that multiple containers are nestable.

34. A method for storing swimming pool maintenance accessories comprising an elongate member, a flexible hose, and at least one other accessory, the method comprising the steps of:

providing a container comprising a generally rectangular bottom panel having opposing sides and opposing ends, a pair of generally rectangular opposing side panels extending upwardly from the respective sides of said bottom panel, a pair of generally rectangular opposing end panels extending upwardly from the ends of said bottom panel, said side panels and end panels having upper portions defining a generally rectangular first access opening, each of said end panels comprising upper portions defining a notch, and a shelf panel positioned in spaced relation from said bottom panel and from said first access opening to define respective lower and upper storage compartments at least one of said side panels having a second access opening therein communicating with the lower storage compartment, positioning the elongate member to be received in the notches of said side panels;

positioning the flexible hose in the upper storage compartment; and positioning the at least one other pool maintenance accessory in the lower storage compartment.

35. A method according to claim 34 wherein said container further comprises at least one mounting bracket carried by at least one of said side panels; and further comprising the step of mounting at least one other pool maintenance accessory to said at least one mounting bracket.

* * * * *